(12) United States Patent
Stanley et al.

(10) Patent No.: US 8,700,265 B2
(45) Date of Patent: Apr. 15, 2014

(54) OCCUPANT CLASSIFICATION SYSTEM (75) Inventors: James Gregory Stanley, Novi, MI (US); George Theos, West Bloomfield, MI (US); Phil Maguire, Royal Oak, MI (US); Joe Slis, Holly, MI (US)

(73) Assignee: TK Holdings Inc., Auburn Hills, MI (US)

( * ) Notice: Subject to any disclaimer, the term of this patent is extended or adjusted under 35 U.S.C. 154(b) by 1515 days.

(21) Appl. No.: 11/704,373

(22) Filed: Feb. 9, 2007

(65) Prior Publication Data
US 2007/0200721 A1    Aug. 30, 2007

Related U.S. Application Data

(60) Provisional application No. 60/743,278, filed on Feb. 10, 2006.

(51) Int. Cl.
*B60R 22/00* (2006.01)
*E05F 15/00* (2006.01)
*G05D 1/00* (2006.01)
*G06F 7/00* (2006.01)

(52) U.S. Cl.
USPC ........ 701/45; 701/1; 701/36; 701/46; 701/47; 701/49

(58) Field of Classification Search
None
See application file for complete search history.

(56) References Cited

U.S. PATENT DOCUMENTS

| | | | | |
|---|---|---|---|---|
| 5,678,854 A * | 10/1997 | Meister et al. | ................ | 280/735 |
| 6,229,437 B1 * | 5/2001 | Schmid et al. | ................ | 340/438 |
| 6,429,544 B1 * | 8/2002 | Sasaki et al. | ................ | 307/10.1 |
| 6,494,482 B2 * | 12/2002 | Curtis | ........................ | 280/735 |
| 6,609,055 B2 * | 8/2003 | Stanley | ........................ | 701/45 |
| 6,684,973 B2 * | 2/2004 | Baba et al. | ................ | 180/273 |
| 6,768,420 B2 * | 7/2004 | McCarthy et al. | ........ | 340/573.1 |
| 6,810,984 B2 * | 11/2004 | Sakai et al. | ................ | 180/273 |
| 6,818,842 B2 * | 11/2004 | Gray et al. | ................ | 177/144 |
| 6,825,765 B2 * | 11/2004 | Stanley et al. | ................ | 340/561 |
| 6,966,577 B2 * | 11/2005 | Baba et al. | ................ | 280/735 |
| 7,134,715 B1 * | 11/2006 | Fristedt et al. | ............ | 297/180.12 |
| 2003/0062996 A1 * | 4/2003 | Flanagan et al. | ............ | 340/457 |
| 2003/0151239 A1 * | 8/2003 | Murphy | ........................ | 280/735 |
| 2004/0113634 A1 | 6/2004 | Stanley et al. | | |

* cited by examiner

*Primary Examiner* — Bhavesh V Amin
(74) *Attorney, Agent, or Firm* — Foley & Lardner LLP (57) ABSTRACT

The disclosed capacitance sensing apparatus may be used in an occupant classification system. The sensing apparatus may comprise a sensor pad, a sensing element disposed on the sensor pad for sensing capacitive current, at least one additional electronic element disposed on the sensor pad for providing information related to another parameter, and a switching mechanism. The switching mechanism may electrically connect the at least one additional electronic element to the sensing element during the capacitance measurements and electrically disconnect the at least one additional electronic element from the sensing element after the capacitance measurement.

18 Claims, 6 Drawing Sheets

OCCUPANT CLASSIFICATION SYSTEM

The present application claims priority to U.S. Provisional Patent Application No. 60/743,278, filed on Feb. 10, 2006, and titled "OCCUPANT CLASSIFICATION SYSTEM," the disclosure of which is incorporated herein by reference in its entirety.

BACKGROUND

The present application relates generally to the field of capacitance sensing measurements used for classifying an occupant in a seat of a vehicle and, more particularly, an apparatus and method for eliminating cross talk between the wires connecting the capacitance sensor and other wires in an occupant classification system.

In order to protect vehicle occupants during vehicle crashes, a vehicle may contain one or more safety device that are activated during a vehicle crash. These safety devices are well known in the art and include air bags and seat belt pretensioners. It is usually desirable to configure an automatic restraint system to activate the safety devices to protect the vehicle occupant during the crash event while, at the same time, preventing the safety devices themselves from injuring the occupant. For example, one situation may involve the use of a seat belt pretensioner and an air bag to protect a vehicle occupant in the case of a crash event. If the vehicle occupant is an adult, it may be desirable to have the seat belt pretensioner and the air bag be utilized during the crash event so as to protect the adult occupant from impacting an interior structure of the vehicle. If the vehicle occupant is a child, the impact from a deployed airbag may be injurious to the child. Thus, it may be desirable to disable the deployment of the air bag during the crash event if it is determined that the vehicle occupant is a child. Thus, the classification of whether a particular occupant is a child or an adult should be ascertained.

Besides mitigating any injury to the vehicle occupant, occupant classification is also desirable to prevent the unnecessary use of a particular safety device. For example, one situation may involve the use of two safety devices in which only one safety device is necessary when the vehicle occupant is a child and two safety devices are necessary when the vehicle occupant is an adult. The reason is that an adult usually has a greater mass and, as a result, greater momentum in which to hit an internal structure of the vehicle during a crash event. Conversely, a child has less mass and will have a smaller momentum during a crash event. As a result, the adult may have a greater need of the second safety device so as to absorb the additional momentum caused by the adult's greater mass. A child will not need the second safety device, and it is desirable to prevent the unnecessary use of the additional safety device in such a circumstance so as to avoid the time and expense of replacing or resetting the second safety device. Thus, the classification of whether a particular occupant is a child or an adult should be ascertained for this reason as well.

One approach for detecting whether a particular occupant in a particular seat is an adult or child is by sensing the influence of the occupant upon an electric field generated proximate to the seat on which the occupant is situated. A capacitance sensor may detect a change in the electric field caused by the occupant because the occupant has dielectric and conductive properties that can influence an electric field.

A capacitance sensor measures the capacitance of one or more electrodes using the relationship between received and applied signals for a given electrode configuration. U.S. Patent Application Publication 2004/0113634 (U.S. patent application Ser. No. 10/707,238, filed on Nov. 30, 2003) (herein incorporated by reference in its entirety) discloses an occupant sensor used to distinguish a child or infant from an adult. For example, a normally seated adult occupant provides a substantially larger increase in capacitance relative to an empty seat, than does a child in a rear facing child seat. The occupant sensor can discriminate a child seat from an adult because the child in a child seat does not have a large surface of its body very near to the sensor electrode contained in the seat bottom. Usually there is a significant gap, up to several inches, between the child in the child seat and the seat bottom. Because child seats are typically made of plastic, the seats themselves are not sensed directly by the occupant sensor. Because only a small portion of the surface of the child is near to the sensor electrode, the capacitance measured by the capacitance sensor is relatively low, and more particularly, less than the threshold capacitance for detecting a normally seated adult occupant.

The capacitance sensor are usually disposed on sensing pads connected to a vehicle seat. Wires in a sensing harness connect the capacitance sensor to an electronic control unit (ECU), which detects signals from the capacitance sensors and determines whether the vehicle occupant is a child or an adult. However, if another wire that is not connected to the capacitance sensor comes from the same connector and is grounded (for example, inside the ECU), the distance between the capacitance sensor wires and the grounded wire will significantly affect the capacitive coupling to ground. This effect is known as cross talk. Cross talk may be caused by any wire not connected to the sensor electrodes in the sensor harness connecting the ECU to the sensing pad. Because the simplest harness design is a group of discrete wires next to each other, the spacing and orientation of the wires relative to each other is not known or held constant. Thus, changes in the spacing and orientation of the wires could change the capacitive current out to the sensing pad and provide a false reading, such as making an empty seat appear to be a seat with an adult in it, a seated adult may appear to be an empty seat, a seated child may appear to be a seated adult, or a seated adult may appear to be a seated child. Cross talk can also be caused by components not contained in the sensing harness. For example, if the other elements on the sensing pad shift relative to each other, the current sent out to the sensing element could also change.

Currently, one technique to reduce or eliminate cross talk is to use special connectors and coaxial cable to separate the capacitance sensor wires and other wires in the system. Such a technique may be costly. Thus, there is a need for a capacitance sensing apparatus for use in an occupant classification system that can reduce or eliminate cross talk which does not rely on special connectors or coaxial cable.

SUMMARY

According to one embodiment of the present invention, a capacitance sensing apparatus may comprise: a sensor pad, a sensing element disposed on the sensor pad for sensing loading or capacitive current, at least one additional electronic element for providing information related to another parameter, and a switching mechanism. The capacitive current increases as the capacitive coupling between the sensing element and ground increases. The switching mechanism may electrically connect the at least one additional electronic element to the sensing element during capacitance measurements and electrically disconnect the at least one additional electronic element from the sensing element after the capacitance measurement.

The additional electronic element may be one or more of a sensor (such as a temperature sensor or an empty seat detector), an encoding element for identifying an individual seat pad, and the like. Also, the wires connecting the sensing element and the at least one additional electronic element to an electronic control unit (ECU) may be bundled together in a sensing harness. In one embodiment, the sensing harness may have a mechanical isolation wall (such as a spacer or thick-walled tube) for isolating the wires within the sensor harness from wires connected to the sensor pad but not within the sensor harness.

According to another embodiment of the present invention, an occupant classification system is disclosed, which comprises a capacitance sensor and an ECU. The capacitance sensor may comprise a sensor pad, a sensing element disposed on the sensor pad, at least one additional electronic element for providing information related to another parameter, and a switching mechanism. The switching mechanism may electrically connect the at least one additional electronic element to the sensing element during a capacitance measurement and electrically disconnect the at least one additional electronic element from the sensing element after the capacitance measurement. The ECU may be in electrical communication with the sensing element and the at least one additional electronic element using a sensing harness, and may be configured to send a time varying voltage to the sensing element and measure the sensed capacitance during the capacitance measurements, and configured to classify the occupant on a seat based on the sensed capacitance.

According to another embodiment of the present invention, an occupant sensing system for sensing an occupant of a vehicle seat is disclosed, which comprises a capacitance sensor and a vehicle seat. The capacitance sensor may comprise a sensor pad; a sensing element disposed on the sensor pad; at least one additional electronic element for providing information related to another parameter; and a switching mechanism. The switching element may be for electrically connecting the at least one additional electronic element to the sensing element during capacitance measurements and for electrically disconnecting the at least one additional electronic element from the sensing element after the capacitance measurement. The sensor pad, the at least one additional element, and the switching mechanism may be provided in a vehicle seat.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present application will become apparent from the following description, appended claims, and the accompanying exemplary embodiments shown in the drawings, which are briefly described below.

DETAILED DESCRIPTION

Figure 1:
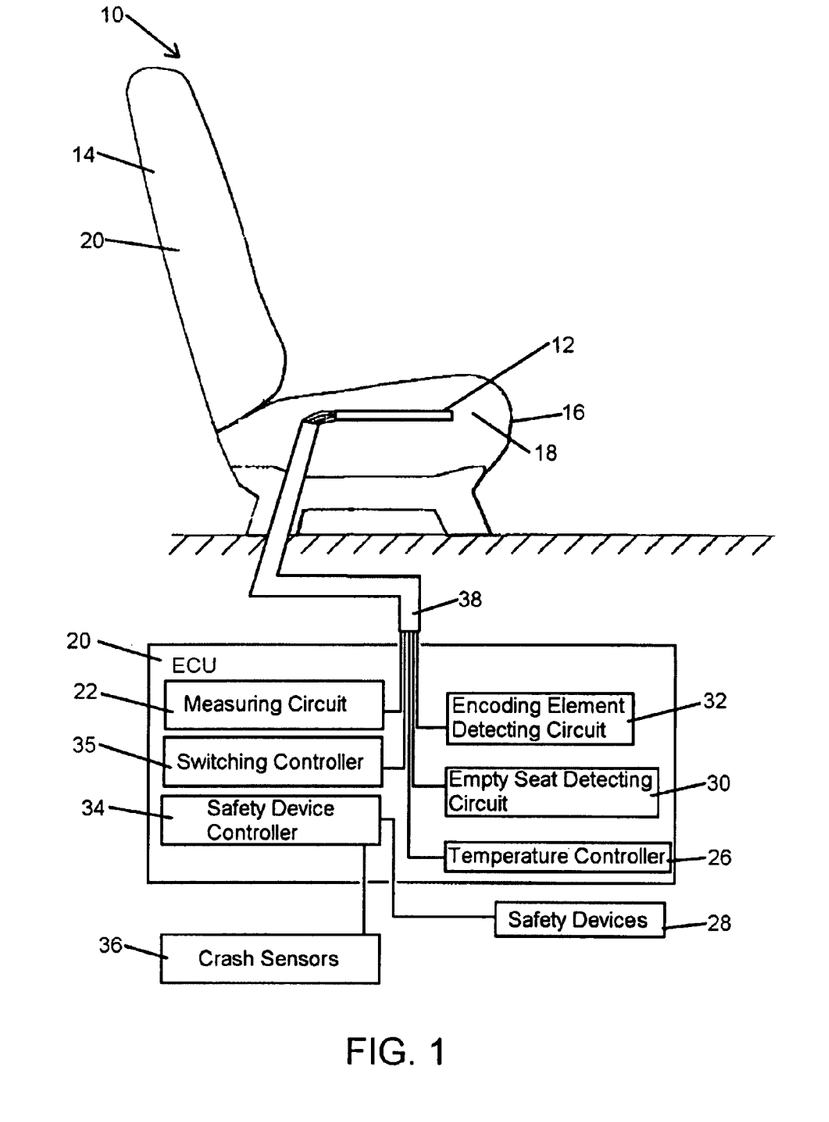
FIG. 1 is a schematic view of an occupant classification system according to an embodiment of the present invention.

FIG. 1 is a schematic view of an occupant classification system 10 according to an embodiment of the present invention. The occupant classification system 10 may include a sensor pad 12 with a sensing element, such as a capacitance sensor. The sensor pad 12 may be, for example, placed in a seat bottom 16 close to the top of a foam cushion or seat pad 18. However, the capacitance sensor 12 may also be located elsewhere, for example in the seat back 20. The system 10 also includes an electronic control unit (ECU) 20 that can be provided in any suitable location within the seat, or throughout the vehicle.

Figure 2:
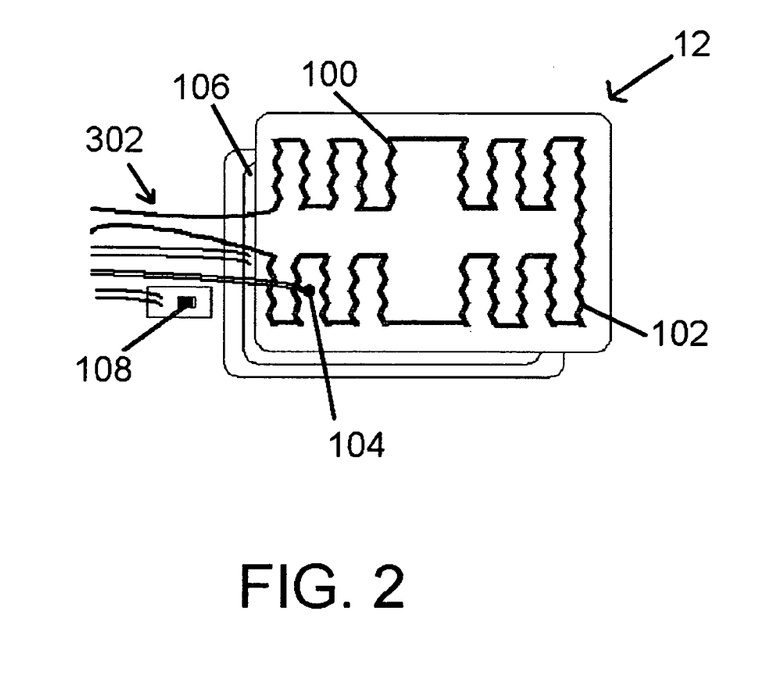
FIG. 2 is a schematic view of a sensor pad according to an embodiment of the present invention.

FIG. 2 shows an embodiment of the sensor pad 12 which may include a sensing element 100, a temperatures sensor 104, an empty seat detector 106, and an encoding element 108.

As to the sensing element 100, it may comprise a conductor 102 disposed on the surface of the sensor pad 12. A measuring circuit 22 located in the ECU 20 of FIG. 1 may send a time varying voltage out to the sensing element 100, and then measure the loading or capacitive current to ground from the sensing element 100. The time varying voltage could take many shapes although the preferred shape is a sinusoidal signal at frequencies between 50 kHz and 150 kHz. This loading or capacitive current that is sensed by the measuring circuit 22 determines the capacitance of the circuit, which increases significantly when an adult occupant is on the vehicle seat 14 and only slightly when there is a child seat on the vehicle seat 14.

The sensor pad 12 and sensing element 100 (collectively known as the sensing electrode) may be constructed in a variety of ways, and the method of construction is not considered limiting. For example, the sensor pad may be constructed using a rigid or a flexible circuit board using known printed circuit board techniques such as etching or deposition of conductive materials applied to a dielectric substrate. Alternately, the sensor pad may be the foam cushion or seat pad 18 itself with a discrete conductor, such as a conductive film, sheet or mesh, as the sensing element 100.

The sensor electrode (i.e., the sensor pad 12 and sensing element 100) may be shaped and located so as to be able to distinguish the class of vehicle occupants for which a safety device 28 of FIG. 1 (for example an air bag inflator module) should be deployed from the class of vehicle occupants for which the safety device 28 should not be deployed. Thus, a more serious injury to an occupant than would otherwise incur without the deployment of the safety device 28 is avoided. For example, the sensor electrode may be shaped and located so that the measured capacitance is substantially greater for an adult passenger for which the safety device 28 should be deployed, and substantially less for a passenger such as an infant, a child, or a booster seat with or without a child for which the safety device 28 should not be deployed.

In one embodiment, the sensing element may function as the seat heating element so as to provide a comfortable seating environment for the occupant. In such an embodiment, the conductors 102 may function as a resistive heating element but should be sufficiently conductive to function as the sensing element, i.e., suitable to detect changes in the electric field caused by a passenger sitting in the vehicle seat. In an alternative embodiment, a seat heating element distinct from the sensing element can be disposed on the sensor pad 12 and/or the seat pad 18. If heating is included, a temperature sensor 104, such as a thermistor, may be disposed near a part of the heating element, which may be used for controlling the temperature of the seat. The ECU 20 of FIG. 1 may include a temperature controller 26 that is known in the art. The temperature controller 26 may include a temperature measuring circuit which can receive measurements from the temperature sensor 104 to determine the temperature of the sensor pad 12 and a temperature generating circuit which can provide a signal to the heating element so as to control its operation such that a desired temperature of the seat can be maintained in a closed-loop process.

Referring back to FIG. 2, an empty seat detector 106 may also be disposed on the surface of the seat pad 18 and/or sensor pad 12. The empty seat detector 106 may be used to identify if the seat is actually empty or contains a child seat because some child seats create such a small change in the current sent out to the sensing pad that it may not be possible to separate an empty seat case from a child seat case using the capacitance sensor. According to one embodiment, the empty seat detector may be a membrane switch. The membrane switch is located on a circuit that runs to and from a empty seat detecting circuit 30 in the ECU 20. A current is supplied in the circuit from the empty seat detecting circuit 30 to the membrane switch. When there is no occupant seated in the seat 14, the membrane switch, which is essentially separated electrical contacts, is in an open state, i.e., the contacts are not touching each other. This open state prevents the current flow from returning to the empty seat detecting circuit 30. However, when an occupant sits on the seat 14, the weight of the vehicle occupant acts on the membrane switch, causing the separated contacts of the switch to contact each other; thus, closing the circuit. The closed circuit results in the current flow from the empty seat detecting circuit 30 to return to the empty seat detecting circuit 30, which signals to the ECU a seated occupant. When the occupant rises from the seat 14, the contacts separate again, thus preventing the current flow from returning to the empty seat detecting circuit 30, thus indicating to the ECU an empty seat. Although a membrane switch is described, other empty seat detectors can also be used, such as a force sensitive resistive film sensor, a strain gage, a magnetostrictive sensing element, or the like.

As to the encoding element 108 (also called the serialization part), this element may be disposed near or on the sensor pad 12. The encoding element is used for identifying an individual sensor pad 12 by sending information to the encoding element detecting circuit 32 located in the ECU 20. For example, the encoding element 108 may be a memory, which stores the serial number of the pad, the date of manufacture, the type of sensor, and/or any other type of information.

The encoding element detecting circuit 32 may read in the information stored in the encoding element 108 and store this information in the memory (not shown) of the ECU for retrieval, if desired.

The ECU 20 of the system 10 is connected to the various components of the occupant classification system 10 including the sensing element 100, the temperature sensor 104, the empty seat detector 106, and the encoding element 108. The ECU may contain the measuring circuit 22 for making capacitance measurements based on readings from the sensing element 100, the temperature controller 26 for measuring the signals from the temperature sensor 104, the empty seat detecting circuit 30 for measuring the signals from the empty seat detector 106, and the encoding element detecting circuit 32 for detecting the signals from the encoding element 108. In addition, a safety device controller 34 is located within the ECU for receiving signals from one or more crash sensors 36 and sending signals to one or more safety devices 28. The components of the ECU 20 shown in FIG. 1 may be contained in one or more microprocessors, which include a computing portion and a memory portion.

The components of the ECU 20 connect to the components of the sensing pad 20 through a series of wires. FIG. 2 shows the separate components of the sensor pad 12 and the wires that connect to those components. One or more of the wires coming from the ECU 20 may be bundled in a single sensing harness 38 as shown in FIG. 1. It is this bundling of wires in which cross talk may become a problem. As previously mentioned, the wires that connect the ECU 20 to the sensing pad 12 come out of the ECU and are not shielded. If another wire coming from the same connector is grounded, for example, inside the ECU, the distance between the sensing pad connection wires and the grounded wire will significantly affect the capacitive coupling to ground. The simplest harness design is a group of discrete wires next to each other in which the spacing of the wires relative to each other may change. A change in wire spacing may lead to a change in the measured capacitance, which may result in a false reading.

To address the issue of wire spacing, an approach has been developed in which all of the elements with wires going out to the sensor pad 12 are joined onto a sensor node when making the capacitance measurements. With this joining of all the components to the sensor node, essentially all of the wires and elements associated with the sensing harness 38 and sensor pad 12 become part of the capacitance sensor during capacitance measurements. When all components become part of the capacitance sensor, there is never a problem with inter-element current flowing, and thus any shift that might happen because of the inter-element current is eliminated. Thus, sensor measurement shift issues are not created even when one or more of the wires coming from the ECU 20 are bundled in the single sensing harness 38.

Figure 3A:
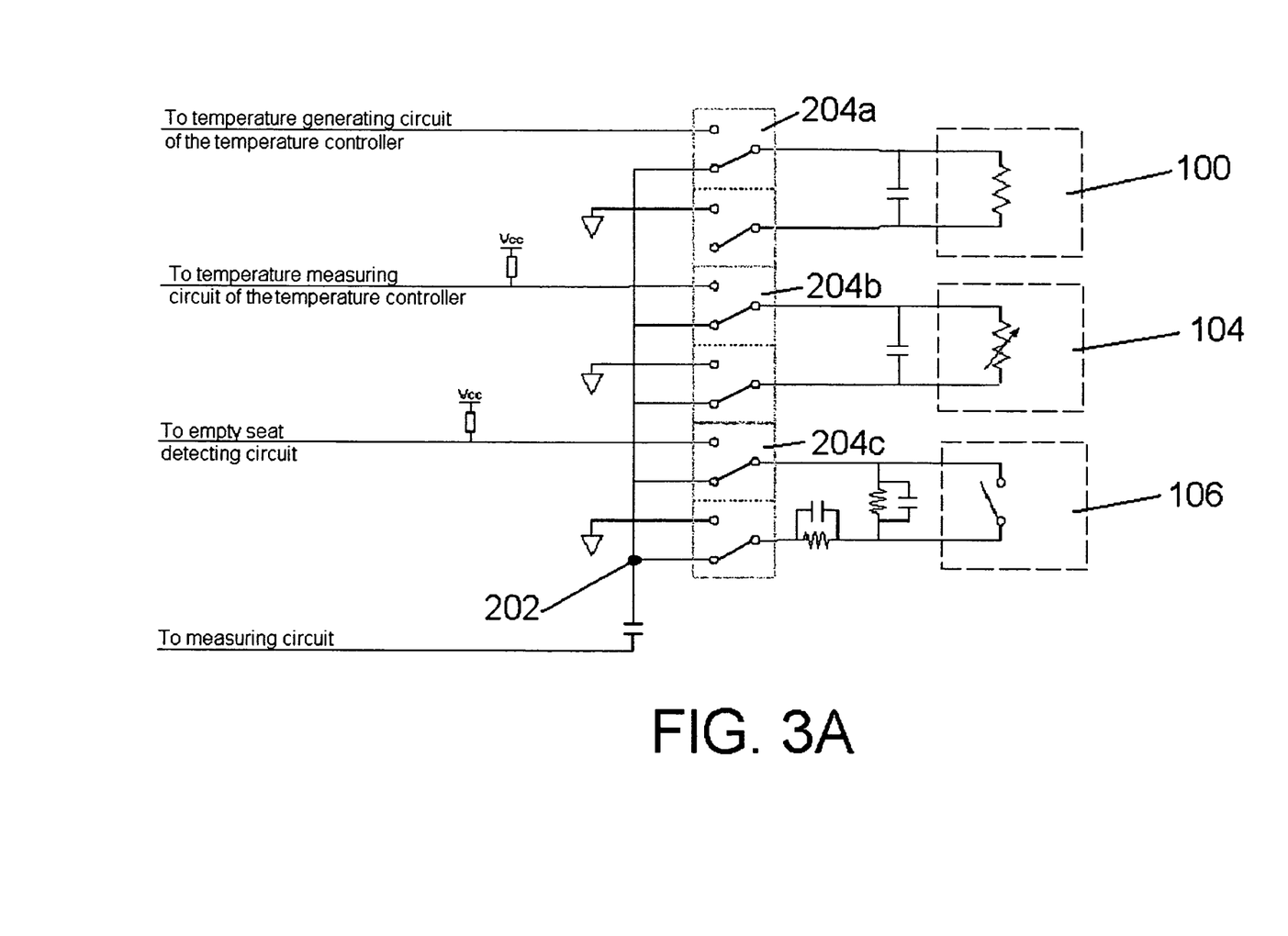
FIGS. 3A and 3B are circuit diagrams for illustrating the connection and disconnection of the non-sensing elements to a sensing node, respectively, according to an embodiment of the present invention.
Figure 3B:
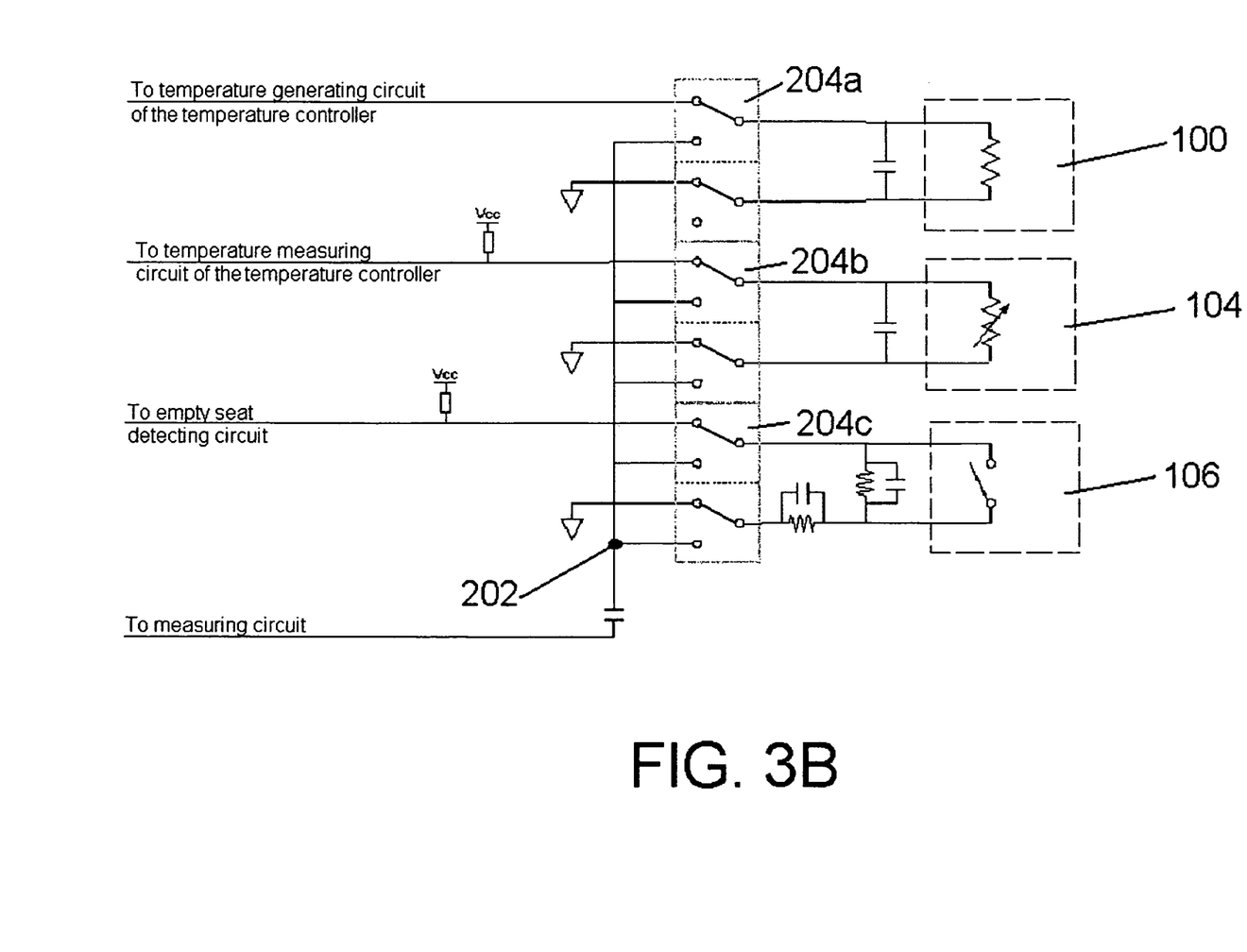

FIG. 3A shows one embodiment in which all the elements with wires going out of the sensor pad 12 through the sensing harness 38 are joined onto a sensor node 202 when making capacitance measurements. FIG. 3B shows the embodiment of FIG. 3B in which all the elements with wires going out of the sensor pad through the sensing harness 38 are not joined onto the sensor node 202 when not making capacitance measurements. The embodiment of FIGS. 3A and 3B shows switching mechanisms 204a through 204c which allow the individual components of the sensor pad 12 to become part of the capacitance sensor or to work independently so as to carry out their individual functions. The switching mechanisms work as follows. When the switching mechanism 204a through 204c are in the "down" position as shown in FIG. 3A, the sensing/heating element 100, the temperature sensor 104, and the empty seat detector 106 are all connected to the sensing node 202. When all the switching mechanism 204 through 204c are set in this position, the empty seat detector 106 and the temperature sensor 104 become part of the capacitance sensor along with the sensing element 100. Thus, eliminating any problem with inter-element current flowing, and any measurement shift resulting therefrom.

When the switching mechanism 204a through 204c are in the "up" position as shown in FIG. 3B, the sensing/heating element 100, the temperature sensor 104, and the empty seat detector 106 are not connected to the sensing node 202 but are carrying out their independent functions on different circuits.

The sensing/heating element 100 is connected to the temperature generating circuit in the temperature controller 26 for heating the vehicle seat. The temperature sensor 104 is connected to the temperature measuring circuit in the temperature controller 26 to measure the temperature of the sensor pad. The empty seat detector 106 is connected to the empty seat detecting circuit 30 to detect if the seat is empty.

In addition to the sensing/heating element 100, the temperature sensor 104, and the empty seat detector 106, the encoding element 108 may also be connected onto and off of the sensor node 202 in a similar way. Furthermore, any electronic element near the sensor pad 12, and whose connection wires would go in the same sensing harness from the ECU could be connected onto and off of the sensor node 202 in a similar way.

The sensing node 202 and the switching mechanisms 204a through 204c can be located on the sensor pad 12, in the ECU 20, or elsewhere in the vehicle seat. The switch mechanisms 204a through 204c in FIGS. 3A and 3B may be activated by a switching controller 35 located inside the ECU 20 (as seen in FIG. 1) or in another controlling device.

The ECU 20 may determine the time when the capacitance measurement can take place. The measurement may be at any suitable time, such as at predetermined intervals or at times when the empty seat detector detects an occupant in the seat after a predetermined interval of the seat being empty. When it is time to take a capacitance measurement, the switching controller 35 activates the switching mechanism 204a through 204c. As shown in FIG. 3A, the switching mechanism would be placed in the down position. The sensing/heating element 100, the temperature sensor 104, and the empty seat detector 106 then become part of the capacitance sensor. After the measurement is taken, the switching controller 35 commands the switching mechanism 204a through 204c to be placed in the "up" position, which allows the sensing/heating element 100 to resume heating, the temperature sensor 104 to resume sensing temperature, and the empty seat sensor to resume monitoring.

Figure 5A:
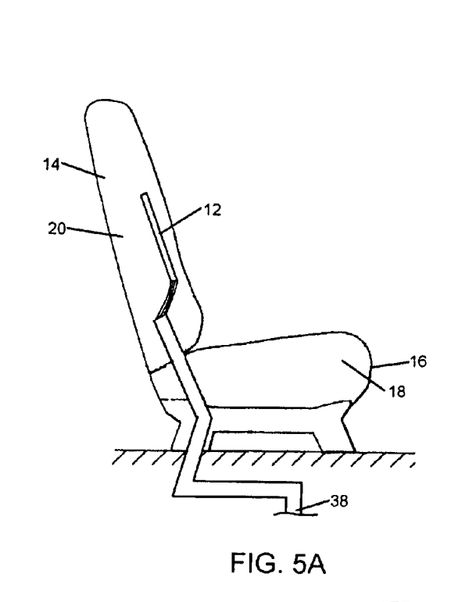
FIGS. 5A-C show different placements of the sensor pad, the temperature sensor, the empty seat detector, the encoding element, and the switching mechanisms within the vehicle seat.
Figure 5B:
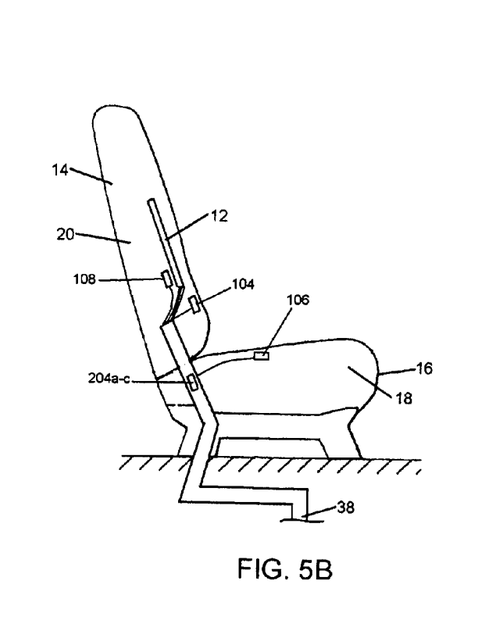
Figure 5C:
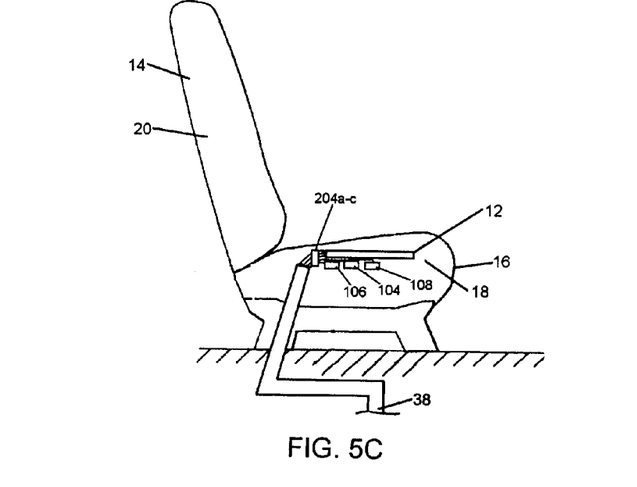

The placement of the various components relative to each other and the vehicle seat may vary. For example, the sensing/heating element 100, the temperature sensor 104, the empty seat detector 106, the encoding element 108, and the switching mechanisms 204a through 204c can be all disposed on the sensor pad 12. In this embodiment, the sensor pad 12 can be placed within the seat bottom 16 (as seen in FIG. 1) or within the seat back 20 (as seen in FIG. 5A). In another example, the sensing/heating element 100 can be disposed on the sensor pad 12, which can be located within the seat bottom 16 or within the seat back 20 while the temperature sensor 104, the empty seat detector 106, the encoding device 108, and the switching mechanisms 204a through 204c are disposed elsewhere within the seat, as shown, for example, in FIGS. 5B and 5C.

Once the class of the vehicle occupant is determined by the measuring circuit 22, the information is fed to the safety device controller 34. During a crash event, a crash sensor 36 will be activated and send a signal to the safety device controller 34. The safety device controller 34 will then send activation signals to one or more of the appropriate safety devices 28 based on the class of vehicle occupant (such as whether the occupant is a child or an adult).

With the switching controller and mechanisms, the wiring and components of the sensor pad can be grouped closely together during capacitance measurements without potential sensing problems associated with the wires and elements being at different potentials from the sensing element. Thus, the potential measurement shifts caused by currents going from the sensor connection wires to nearby wires in the sensing harness (wires to the temperature sensor, wires to the empty seat detector, wires to the encoding element, or any other wires in the sensing harness) or currents going from the sensor pad to nearby sensor elements (the temperature sensor, the empty seat detector, the encoding element, or any other element that is near to the sensor elements) are eliminated.

Ideally, all of the wires in the sensing harness 38 (such as shown in FIG. 2) attach to the same connector and are not near any wire that does not turn into part of the sensor through the switching mechanism, such as the power lines, ground line, communications lines, etc. One preferred embodiment would use a separate connector dedicated to all of the wires that could become part of the capacitance sensor during the capacitance measurements. This preferred embodiment would also separate the connector that is feeding the wires to the sensing pad 12 (the first connector) from the connector that is attaching the ECU 20 to the power, the ground, etc. (the second connector). The objective of this separation is to keep the wires of sensing harness 38 from being too close to the wires of the "non-sensing harness." The first and second connectors could be separated, such as being on the same side of the ECU enclosure or being on different sides of the ECU enclosure.

According to another embodiment of the sensor pad, mechanical isolation of the wires within the harness from other wires or ground planes may be used, which would allow discrete wires to be used within the sensor harness. Mechanical isolation of the common sensing harness is provided by a spacer of some sort between the wires and any conductor that could be close to the wires. Ideally, the harness isolation also keeps fluids from filling the volume between the harness wires and any other wires. A preferred embodiment uses a thick walled tubing for the isolation, i.e., an isolation wall.

FIGS. 4A-D show several concepts for the mechanical isolation wall 304 for the wires 302 of the sensing harness 38. The isolation wall 304 itself could be made out of any suitable plastic or rubber material that would allow some bending, would resist compression when forces are applied to the outside of the wall, meet durability requirements of the application, have stable dielectric properties over temperature, and not absorb water when in humid environments.

Figure 4A:
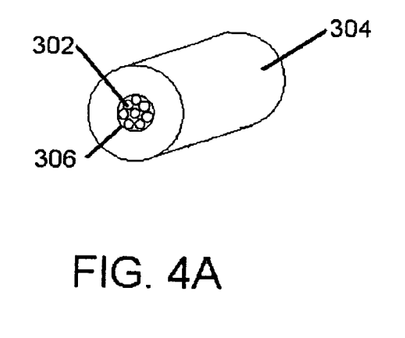
FIGS. 4A-D show different embodiments of an isolation wall for the mechanical isolation of the common sensing harness according to another embodiment of the present invention.
Figure 4B:
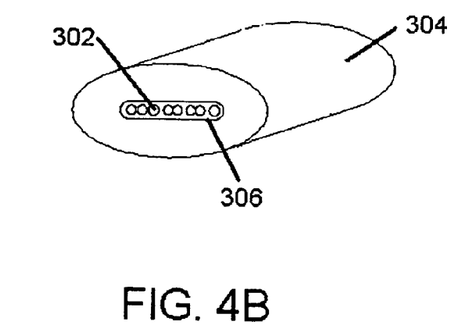

FIG. 4A shows an isolation wall 304 in a more cylindrical shape in which the wires 302 of the sensing harness 38 run through a circular aperture 306 in the center of the cylindrical shape. In this embodiment, the isolation wall 304 is thick-walled tubing made from a solid material. The wires 302 could be round, flat, rectangular, or have other cross-sections. The isolation wall 304 and the wires 302 may then be disposed inside a tubing (not shown). FIG. 4B has an isolation wall 304 with a more oval cross section in which the wires 302 of the sensing harness 38 run through a slotted aperture 306 in the center of the oval shape such that the wires are arranged in a row. The isolation wall 304 and the wires 302 may then be disposed inside a tubing (not shown).

Figure 4C:
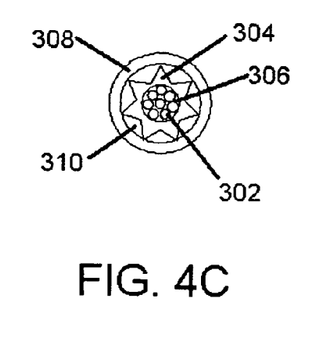

As in the case of FIGS. 4A and 4B, FIG. 4C shows an isolation wall 304 made from a plastic or rubber material that is extruded directly over the wires forming a spacer. The isolation wall 304 can be of any suitable cross-section. For example, the isolation wall 304 is located within a corrugated tube 308 in such an arrangement that there is a spacing 310 between the isolation wall 304 and the corrugated tubing 308. The wires 302 of FIG. 4C are fed through a circular aperture 306 in the center of the isolation wall.

Figure 4D:
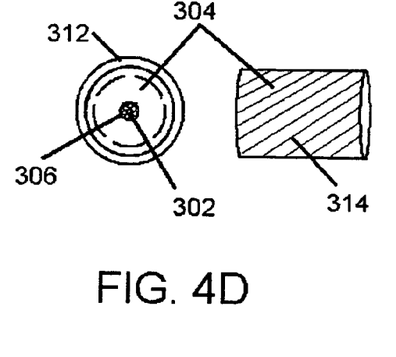

FIG. 4D shows another embodiment of the isolation wall 304 with grooves 314 formed along the outer surface of the isolation wall. The left side of FIG. 4D shows an isolation wall 304 encased in a tubing 312; and the right side of FIG. 4D shows the exterior of the isolation wall 304 with the tubing 312 removed. As in FIG. 4C, the wires 302 of the sensing harness 38 in FIG. 4D are fed through a center aperture 306 running in the center of the isolation wall.

Because the isolation walls 304 of FIG. 4C and FIG. 4D are not a solid material (as is the case for the embodiments of FIGS. 4A and 4B), the ends of the tubing in FIGS. 4C and 4D (i.e., the corrugated tubing 308 and the tubing 312) may need to be sealed to eliminate problems with fluids (e.g. water) between the tubing 308 or 312 and the isolation wall 304. Water between the tubing 308 or 312 and the isolation wall 304 would reduce the effectiveness of the isolation wall 304. The patterns for the isolation wall 304 in FIGS. 4C and 4D could be spiraled to help water drainage.

Besides the embodiments shown in FIG. 4A through 4D, the isolation wall 304 could be any suitable cross section. The aperture in which the wires 302 are fed through can also be any suitable shape and located at any suitable location within the isolation wall. For example, the wires 302 could be located in the center of the isolation wall (such as shown in FIGS. 4A through 4D) or in an off-center location. Furthermore, there could be grooves along the inside or outside of the isolation wall without reducing the wall's effectiveness under most conditions. As previously mentioned, the isolation wall could be spiraled to help water drain off. It is possible to extrude an isolation wall directly over the wires or the isolation wall could be a part that is molded directly over the wires. Furthermore, the isolation wall could have a cut that extends from its outer surface to the center to allow for easier system assembly.

Although the above description discloses various embodiments of the present invention, other embodiments are also contemplated. For example, the seat 14 of FIG. 1 can incorporate a seat heater separate from the current sensing functions so as to provide a comfortable seating environment for the occupant. Such a seat heater may be activated by an ON-OFF switch, and the temperature thereof is regulated, for example, by a relay under control of a thermostat. The seat heater may comprise a heating element, for example, a resistive heating element.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A capacitance sensing apparatus comprising:
a sensor pad;
a sensing element disposed on the sensor pad;
at least one additional electronic element for detecting whether the seat is occupied; and
a switching mechanism for electrically connecting the at least one additional electronic element to the sensing element during capacitance measurements so that both the sensing element and the additional electronic element form a capacitive sensing electrode and for electrically disconnecting the at least one additional electronic element from the sensing element after the capacitance measurements.

2. The capacitance sensing apparatus according to claim 1, wherein the at least one additional electronic element is a force sensitive sensor.

3. A capacitance sensing apparatus comprising:
a sensor pad;
a sensing element disposed on the sensor pad;
at least one additional electronic element for providing information related to another parameter; and
a switching mechanism for electrically connecting the at least one additional electronic element to the sensing element during capacitance measurements and for electrically disconnecting the at least one additional electronic element from the sensing element after the capacitance measurements;
wherein the sensing element functions as a heater element.

4. The capacitance sensing apparatus according to claim 1, wherein wires connecting to the sensing element and the at least one additional electronic element to an electronic control unit are bundled together in a sensing harness, and wherein the sensing harness has a mechanical isolation wall for isolating the wires within the sensor harness from wires connected to the sensor pad not within the sensor harness.

5. The capacitance apparatus according to claim 4, wherein the mechanical isolation wall is a spacer or thick-walled tubing.

6. An occupant classification system comprising:
a capacitance sensor comprising:
a sensor pad;
a sensing element disposed on the sensor pad;
an empty seat detector for determining whether the seat is occupied, wherein the empty seat detector includes an additional electronic element; and
a switching mechanism for electrically connecting the at least one additional electronic element to the sensing element during capacitance measurements and for electrically disconnecting the at least one additional electronic element from the sensing element after the capacitance measurements; and
an electronic control unit (ECU) in electrical communication with the sensing element and the at least one additional electronic element using a sensing harness, wherein the ECU is configured to send a time varying voltage to the sensing element and the additional electronic element and measure the sensed capacitance during the capacitance measurements, and configured to classify the occupant on a seat based on the sensed capacitance.

7. The occupant classification system according to claim 6, wherein the ECU is configured for operating the switching mechanism.

8. The occupant classification system according to claim 6, wherein the sensing element functions as a heater element, and wherein the ECU contains a temperature controller for controlling the heater element.

9. The occupant classification system according to claim 6, wherein the sensing harness has a mechanical isolation wall for isolating the wires within the sensor harness from wires connected to the sensor pad not within the sensor harness.

10. The occupant classification system according to claim 9, wherein the mechanical isolation wall is a spacer or thick-walled tubing.

11. An occupant sensing system for sensing an occupant of a vehicle seat comprising:
a capacitance sensor, wherein the capacitance sensor comprises:
a sensor pad;
a sensing element disposed on the sensor pad;
an empty seat detector for determining whether the seat is occupied, wherein the empty seat detector includes an additional electronic element; and a switching mechanism for electrically connecting the additional electronic element to the sensing element during capacitance measurements and for electrically disconnecting the additional electronic element from the sensing element after the capacitance measurements; and wherein the sensor pad, the additional element, and the switching mechanism are provided in the vehicle seat.

12. The occupant sensing system according to claim 11, wherein the sensor pad is located within a seat bottom of the vehicle seat.

13. The occupant sensing system according to claim 11, wherein the sensor pad is located within a seat back of the vehicle seat.

14. The occupant sensing system according to claim 11, wherein the empty seat detector is located adjacent the sensor pad within a seat bottom of the vehicle seat.

15. The occupant sensing system according to claim 11, wherein the empty seat detector is located adjacent to the sensor pad.

16. The occupant sensing system according to claim 11, wherein the empty seat detector is disposed on the sensor pad.

17. The occupant sensing system according to claim 11, wherein the sensor pad is disposed in one of a seat bottom and a seat back of the vehicle seat, and wherein the empty seat detector is disposed within the other of the seat bottom and the seat back.

18. The occupant classification system according to claim 11, wherein the sensing element functions as a heater element, and further comprising a temperature controller for controlling the heater element.

* * * * *